United States Patent [19]

Stocker

[11] 4,422,242
[45] Dec. 27, 1983

[54] THROTTLE VALVE LINKAGE ADJUSTMENT GAUGE AND METHOD THEREFOR

[75] Inventor: Raymond Stocker, West Bloomfield, Mich.

[73] Assignee: Ford Motor Company, Dearborn, Mich.

[21] Appl. No.: 249,578

[22] Filed: Mar. 30, 1981

[51] Int. Cl.³ .......................... G01B 5/00; G01B 5/25
[52] U.S. Cl. .............................. 33/181 AT; 33/174 R
[58] Field of Search ............ 33/148 R, 148 E, 148 F, 33/174 R, 174 K, 174 Q, 180 R, 180 AT, 181 R, 181 AT

[56] References Cited

U.S. PATENT DOCUMENTS

| 1,237,746 | 8/1917 | Busch | 33/148 E |
| 2,106,652 | 1/1938 | Pinson | 33/148 E |
| 2,355,211 | 8/1944 | Erickson | 33/181 AT |
| 2,632,255 | 3/1953 | Mosca | 33/180 AT |
| 3,108,382 | 10/1963 | Vorpahl | 33/181 AT |
| 3,640,128 | 2/1972 | Cunning et al. | 33/181 AT |
| 3,783,521 | 1/1974 | Schmidt | 33/181 AT |
| 3,835,547 | 9/1974 | Rishord | 33/180 AT |

FOREIGN PATENT DOCUMENTS

| 642245 | 8/1962 | Italy | 33/148 E |
| 300744 | 6/1971 | U.S.S.R. | 33/181 R |

Primary Examiner—Richard R. Stearns
Attorney, Agent, or Firm—Frank G. McKenzie; Donald J. Harrington

[57] ABSTRACT

A throttle valve linkage gauge comprising a gauge plate adapted to be connected to the pivot of a throttle valve lever. The gauge plate pivotally mounts a pointer arm near its center, one end of the pointer arm being adapted to be connected to the end of a throttle valve control rod, and the other end of the pointer arm having a pointer cooperating with reference indicia provided on the gauge plate to indicate proper alignment of the throttle valve lever pivot and the throttle valve control rod.

5 Claims, 4 Drawing Figures

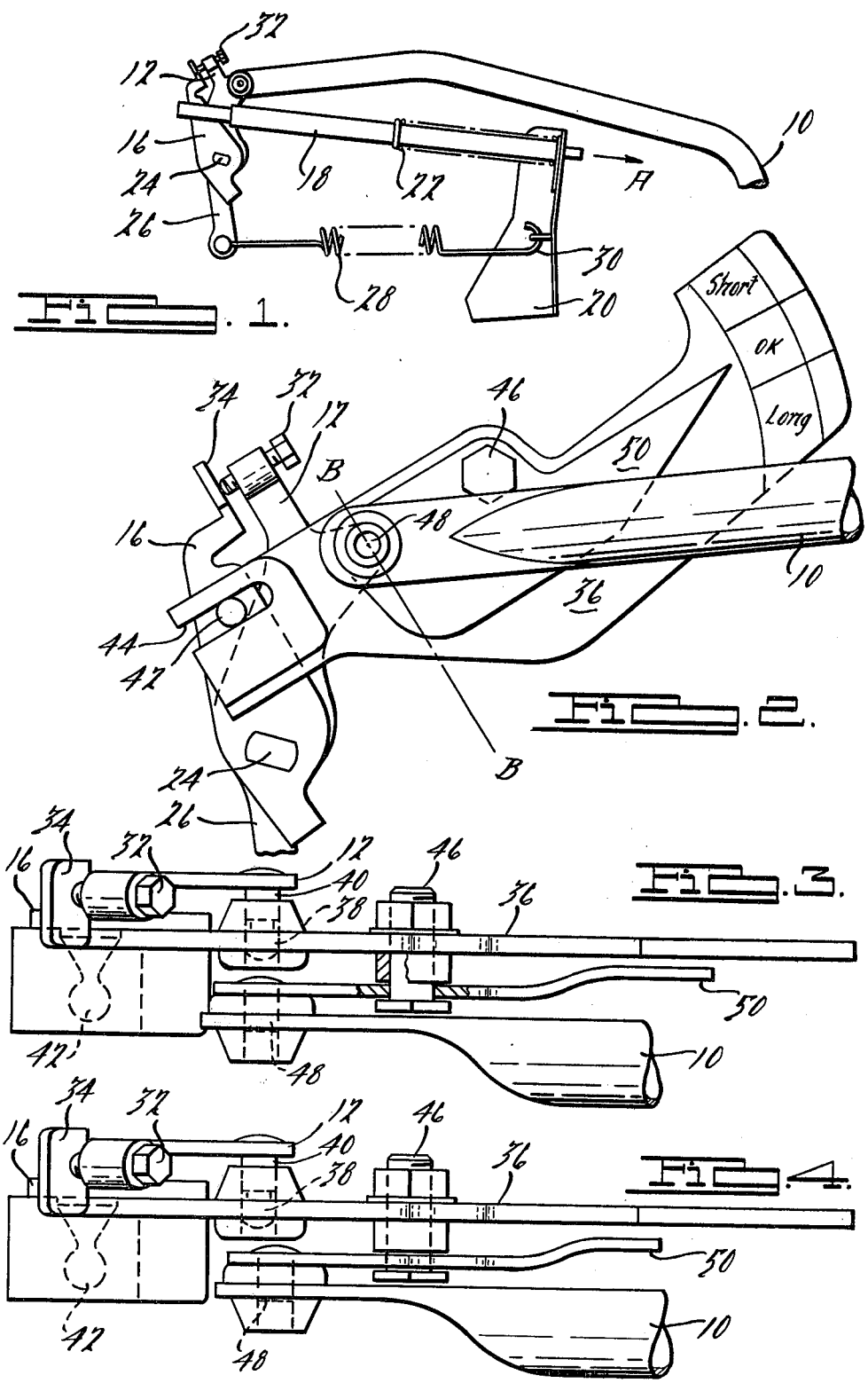

THROTTLE VALVE LINKAGE ADJUSTMENT GAUGE AND METHOD THEREFOR

BACKGROUND OF THE INVENTION

1. Field of the Invention

This invention relates to the field of gauges for adjusting the position of one attachment location with respect to a reference position. More particularly, the invention pertains to a throttle valve adjustment gauge for checking and setting the position of the attachment of a control rod on a carburetor throttle lever.

2. Description of the Prior Art

Conventionally automatic transmissions have a vacuum diaphram attached directly to the transmission case for controlling the position of the throttle valve, which determines the automatic shift scheduling and shift quality. In such transmissions, engine vacuum sensed at the carburetor is a reliable indication of engine output torque and provides a satisfactory means by which the position or state of the throttle valve may be controlled.

In certain transmissions particularly power transmissions that produce overdrive gear ratios, engine vacuum is not an accurate indication of engine torque and cannot be relied on to control the position of the transmission throttle valve. For this reason a mechanical throttle valve actuator in the form of a control rod extends from the throttle valve on the transmission to the throttle lever on the carburetor. By means of the control rod the position of the carburetor throttle is transmitted to the transmission throttle valve and is used as a signal for controlling automatic shift scheduling and shifting quality instead of engine vacuum. The mechanical linkage between the transmission and the carburetor requires initial adjustment when the vehicle is assembled and occasional readjustment whenever the carburetor idle speed setting is changed. Misadjustment of the linkage can produce objectionable shift quality. It is necessary, therefore, that an objective indication of the location of the attachment of the throttle valve control rod on the throttle valve lever with respect to a reference position be available when the vehicle is assembled and during certain service operations. The reference position of the throttle lever might be the engine curb idle position with the engine off.

SUMMARY OF THE INVENTION

A throttle valve linkage gauge for adjusting and checking the setting of a throttle valve linkage and a method for its use are described. The gauge is used in combination with a throttle lever that is mounted to rotate about an axis as the carburetor throttle rotates and provides an attachment point on which the gauge is mounted. Another rotatably mounted lever is biased by a spring into contact with the throttle lever and provides a first attachment location whose angular position with respect to the throttle lever is adjustable. The first attachment location is the position at which the carburetor end of the control rod is normally attached. When the control rod is removed, the mounting plate of the linkage gauge is mounted at the first attachment location and at an attachment provided on the throttle lever. An indicator arm pivotably connected to the mounting plate carries a second attachment location and has a pointer indicating the angular position of the second attachment with respect to the first attachment. The first and second attachment locations can be brought into alignment by adjusting the angular position of the carburetor throttle valve lever with respect to the throttle lever by adjusting a set screw.

The method for using the linkage gauge requires that the control rod that transmits carburetor throttle motion to the throttle valve of a power transmission be disconnected from a first attachment location on the carburetor throttle valve lever. The throttle valve linkage gauge is installed on the carburetor throttle at the first attachment location. The position of the first attachment is adjustable with respect to a third attachment location used to retain the linkage gauge in position. The control rod is then connected to the linkage gauge at a second attachment location, which is pivotably mounted on the gauge, has an arm extending from the pivot point and is adapted to indicate the angular position of the second attachment location with respect to the first. The position of the first attachment is adjusted to within an acceptable range of alignment with respect to the position of the second attachment by turning an adjustment screw.

It is an object of this invention, therefore, to provide a throttle valve linkage adjustment gauge that can be used to quickly and accurately indicate whether the linkage is set within an acceptable range of tolerance. It is a further object that such a gauge continuously indicate whether the linkage setting is within the acceptable range of tolerance while adjustments are made at each setting. It is another object to this invention to provide a gauge whose use is compatible with the conditions existing on an automotive assembly line and in an automotive service department. The gauge according to this invention provides accurate indication of the throttle valve linkage setting without the need for the engine to be warm or running and without the car having to be hoisted. It is another object of this invention that the gauge provide its indication without having to be calibrated.

BRIEF DESCRIPTION OF THE DRAWING

FIG. 1 is a partial elevation view of the throttle valve control rod assembly and its attachment to the carburetor throttle lever.

FIG. 2 is a side view of the throttle valve linkage adjustment gauge mounted on the carburetor with throttle valve control rod secured to one end of the pointer arm.

FIG. 3 is a top view of the linkage adjustment gauge mounted on the carburetor with the control rod attachment in substantial alignment with the first attachment.

FIG. 4 is a top view of the linkage adjustment gauge mounted on the carburetor indicating the need for an adjustment whereby the control rod attachment would become aligned with the first attachment.

DESCRIPTION OF THE PREFERRED EMBODIMENT

In FIG. 1, a throttle valve control rod 10 is shown in its operative position having one end attached to a carburetor throttle valve lever 12 and the opposite end (not shown) attached to the throttle valve lever of an automatic transmission. An accelerator cable 18 has one end secured to a carburetor throttle lever 16, is guided through the opening of an accelerator engine bracket 20 and is attached to the accelerator pedal of the vehicle for movement by the vehicle operator. Cable 18 moves in the direction of arrow A when the accelerator pedal is depressed and is biased by a compression spring 22 to the return position.

Carburetor throttle valve lever 12 and carburetor throttle lever 16 are pivoted on a common pivot axis 24. When the accelerator cable 18 moves in response to movement of the accelerator pedal, throttle lever 16 rotates clockwise about axis 24 and rotates counterclockwise when the force is removed from the accelerator pedal. In this way, the carburetor throttle is opened and closed in response to operator control. Throttle valve lever 11 has an arm 26 extending radially outward from the pivot axis 24 where a tension spring 28 is attached at one end, the other end of the spring being attached to the engine bracket 20 at a hooked end 30. A service adjustment screw 32 is threaded into the throttle valve lever, one end extending through lever 12 into contact with surface 34 of the throttle lever 16. Accordingly, tension spring 28 operates to maintain contact between adjustment screw 32 and the surface 34 and in this way to return throttle lever 16 when force is removed from the accelerator pedal.

The control rod attachment at its end adjacent the carburetor is shown in greater detail in FIGS. 2 and 3. The adjustment gauge includes a plate 36 having an attachment hole 38 into which a stud 40 extending from throttle valve lever 12 may be inserted. A pin 42 extends outwardly from the throttle lever 16 and provides a second means for supporting plate 36 in a slotted hole 44 formed in the plate. The pointer arm 50 of the gauge is mounted for rotation on the plate 36 about an axis 46 and provides a pin 48 onto which the end of the throttle valve control rod 10 is mounted.

The adjustment gauge operates to align the central axes of pins 40 and 48, which in the correctly adjusted operating position would be the axis for the attachment of the throttle valve control rod 10 on the carburetor throttle valve lever 12. In the normal operating condition, i.e., when the adjustment tool is not being used to align the axes of pins 40 and 48, the end of the control rod 10 is mounted on pin 40.

In order to make the adjustment of the axis of pin 48 with the aid of the adjustment tool, the throttle valve control rod 10 is disconnected from pin 40 of the carburetor throttle valve lever 12. Next, the slotted hole 44 on the plate 36 is fitted over the surface of pin 42 and pin 40 is snapped into hole 38. The attachment of the throttle valve control rod 10 is fitted over pin 48 on the pointer arm 50. At the end of the base plate 36 adjacent the end of the pointer arm are angular ranges on either side of a reference position that indicates whether the location of the axis of pin 48 in relation to the location of the axis of pin 40 is within an acceptable range or whether adjustment is required. The angular position of pointer arm 50 with respect to the ranges on base plate 36 as viewed from the side as in FIG. 2 indicates whether adjustment is required and the sense of direction of the adjusting that would correct the setting.

If adjustment is required, adjustment screw 32 on the carburetor throttle valve lever 12 can be turned to move the pointer into the acceptable region. For example, if the pointer is below the acceptable zone adjustment screw 32 can be turned counterclockwise to move the pointer into the acceptable region, assuming of course, that the thread on screw 32 is a right-hand thread. If the adjustment screw has insufficient travel to bring the pointer into the acceptable region, throttle valve control rod 10 must be readjusted at the transmission lever end so that the fine adjustment can be made with the aid of the adjustment gauge. The line of action of the control rod 10 is along axis B-B and the centerline of pins 40, 42 and the pivot axis 46 are aligned, but this condition of alignment is not necessary for all applications.

FIG. 4 shows the relative location of the attachments for the condition in which the control rod 10 is short and the axes of pins 40 and 48 are not aligned. In this instance as indicated by the position of the pointer, attachment screw 32 should be turned clockwise thereby causing clockwise rotation of the carburetor throttle valve lever 12 about axis 34. This rotation tends to bring the axis of pin 40 into alignment with the axis of pin 48. Alternatively, if the pointer should indicate that the length of the control rod 10 is long, counterclockwise rotation of attachment screw 32 causes counterclockwise rotation of the throttle valve lever 12. Because pin 40 is mounted on lever 12, plate 36 rotates counterclockwise and with it the pivot point 46 about a point on the surface of pin 42. This motion alone would have no effect on the location of the pointer, but because the location of attachment 48 is unaltered as a result of adjustments made to the screw 32, the indicator arm 50 is made to rotate counterclockwise with respect to the axis of the pivot 46 and thus toward the direction of the acceptable range of alignment between the axis of the first and second attachment locations 40 and 48.

Having described a preferred embodiment of my invention what I claim and desire to secure by U.S. Letters Patent is:

1. A gauge for adjusting the position of a first attachment on a first member with respect to a second attachment on a second member comprising:
   a gauge plate carrying a pivot and having a first joint adapted to connect the plate to the first attachment, means to position and support the gauge plate with respect to a pin providing a surface on which the gauge plate can move with respect to said pin, and markings on the surface of the gauge plate spaced radially from the pivot defining angular ranges about the pivot; and
   a pointer rotatably connected to the gauge plate at the pivot having an indicator arm extending radially from the pivot and having a second joint thereon spaced radially from the pivot adapted to connect the pointer to the second attachment whereby the indicator arm points to the angular range markings according to the angular position of the second joint about the pivot.

2. The gauge of claim 1 wherein the support means includes a slot into which can be fitted a pin, the slot providing a surface on which the gauge plate is supported and rotates as the position of the first connection is moved.

3. The gauge of claim 1 wherein the pointer is rotatably connected to the gauge plate so that the pointer moves in a plane that is parallel to the surface of the gauge plate.

4. The gauge of claim 1 wherein the axis of the pivot is perpendicular to the surface of the gauge plate and the pointer moves in a plane that is parallel to the surface of the gauge plate.

5. The gauge of claim 1 wherein the pointer is rotatably connected to the gauge plate so that the pointer moves in a plane that is parallel to the surface of the gauge plate.

* * * * *